US006618683B1

(12) United States Patent
Berstis et al.

(10) Patent No.: US 6,618,683 B1
(45) Date of Patent: Sep. 9, 2003

(54) METHOD AND APPARATUS FOR CALIBRATING AN ACCELEROMETER-BASED NAVIGATION SYSTEM

(75) Inventors: Viktors Berstis, Austin, TX (US); Richard Scott Schwerdtfeger, Round Rock, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/735,591

(22) Filed: Dec. 12, 2000

(51) Int. Cl.[7] .................. G01C 17/38; G01P 21/00; G06F 19/00
(52) U.S. Cl. .................. 702/94; 701/207; 701/300; 701/220; 701/28; 340/10.1; 364/449; 342/165; 342/173; 342/174
(58) Field of Search .................. 702/94; 701/207, 701/300, 220, 28; 342/36, 63; 340/10.1; 364/449

(56) References Cited

U.S. PATENT DOCUMENTS

| | | | | |
|---|---|---|---|---|
| 4,814,711 A | * | 3/1989 | Olsen et al. | 342/331 |
| 4,829,442 A | * | 5/1989 | Kadonoff et al. | 364/449 |
| 4,977,509 A | * | 12/1990 | Pitchford et al. | 364/449 |
| 5,241,481 A | * | 8/1993 | Olsen | 364/449 |
| 5,339,684 A | * | 8/1994 | Jircitano et al. | 73/178 |
| 5,359,889 A | * | 11/1994 | Jircitano et al. | 73/178 |
| 5,721,685 A | * | 2/1998 | Holland et al. | 364/449 |
| 5,781,150 A | * | 7/1998 | Norris | 342/357 |
| 5,797,085 A | | 8/1998 | Beuk et al. | 455/88 |
| 5,867,688 A | | 2/1999 | Simmon et al. | 395/500 |
| 5,872,539 A | * | 2/1999 | Mullen | 342/357 |
| 5,991,692 A | * | 11/1999 | Spencer, II et al. | 701/217 |
| 5,995,884 A | * | 11/1999 | Allen et al. | 364/449 |
| 6,009,359 A | * | 12/1999 | El-Hakim et al. | 701/28 |
| 6,029,213 A | | 2/2000 | Belt et al. | 710/72 |
| 6,047,047 A | | 4/2000 | Aldridge et al. | 379/93.24 |
| 6,292,744 B1 | * | 9/2001 | Want et al. | 701/207 |
| 6,308,134 B1 | * | 10/2001 | Croyle et al. | 701/220 |
| 6,323,807 B1 | * | 11/2001 | Golding et al. | 701/207 |
| 2002/0050932 A1 | * | 5/2002 | Rhoades et al. | 364/449 |
| 2002/0149470 A1 | * | 10/2002 | Mynatt et al. | 340/10.1 |

* cited by examiner

Primary Examiner—John Barlow
Assistant Examiner—Aditya Bhat
(74) Attorney, Agent, or Firm—Duke W. Yee; Marilyn Smith Dawkins; Stephen R. Tkacs (57) ABSTRACT

A navigation device includes accelerometers for measuring movement. Given a beginning location and orientation, the device determines current location and orientation based on the information from the accelerometers. A user enters a list of items, such as a shopping list, into the device and the device determines a path to the items. The device then generates and presents directions for navigation. The path may be calculated to avoid hazards; such as shelves being stocked, congested checkout lines, and spilled items. The item list may be loaded into the device, using the bar code reader, optical character recognition, or through a store computer or the Internet. Planes of infrared beams are arranged within the environment such that a navigation device is likely to or must pass through a plane. A path may be computed to ensure that the navigation device passes through an IR plane. The navigation device has a plurality of IR sensors arranged in a tetrahedron. As the device passes through an IR plane, the device receives signals from the sensors. Given the order and timing of the signals and a location of the IR plane, the device performs a calibration. The device is calibrated without requiring the user to place the device in a cradle.

24 Claims, 5 Drawing Sheets

METHOD AND APPARATUS FOR CALIBRATING AN ACCELEROMETER-BASED NAVIGATION SYSTEM

RELATED APPLICATIONS

The present application is related to commonly assigned and co-pending U.S. patent application Ser. No. 09/735,596 entitled "METHOD AND APPARATUS FOR NAVIGATING AN ENVIRONMENT", filed on even date herewith, and hereby incorporated by reference.

BACKGROUND OF THE INVENTION

1. Technical Field

The present invention relates to navigation and, in particular, to navigation in a building or store. More particularly, the present invention relates to a method, apparatus, and program for calibration of a navigation device while navigating an environment.

2. Description of Related Art

Finding items in a store is often difficult, particularly for people with disabilities, such as vision impairment. Often, a shopper must ask store personnel the locations of items, which typically results in only an aisle number.

One prior art solution is to provide a directory or kiosk to direct shoppers to items within the store. However, shoppers often must make several trips back to the directory or kiosk to locate multiple items, resulting in inefficient use of time and unnecessary travel within the store.

Another prior art solution is to provide shoppers with a device on a shopping cart. The devices communicate with beacons within the store to determine a general location. However, to accurately determine the location, many beacons must be wired throughout the entire store, which is costly and cumbersome. Furthermore, the devices provide only a general location and vicinity to items. The devices do not determine an orientation or direction of the shopper. Thus, the devices cannot effectively direct the shopper to items within the store. The devices must also be in continuous contact with beacons. Thus, the devices are reliant upon the operability and accuracy of the system of beacons in the store.

Prior art navigation devices use global positioning systems (GPS) to determine position within a geographical region. However, GPS is not accurate enough for navigating a small area such as a store and differentiating among locations that may be adjacent to each other or above or below each other in a three dimensional space.

Prior art store systems are typically employed with the assumption that users will use sight to locate items, thus accuracy is not an issue. However, visually impaired people may require specific feedback regarding location and orientation within the environment. For example, a direction of "halfway up the aisle" is not useful unless the person can visually estimate a location within the aisle.

Therefore, it would be advantageous to have an improved method and apparatus for navigation within a store.

SUMMARY OF THE INVENTION

The present invention provides a device for navigation within a building or store. The device includes accelerometers for measuring the movement of the device. Given a beginning location and orientation, the device determines a current location, orientation, and speed based on the information from the accelerometers. A user enters a designated location within a building or store such as a restroom, customer service, sales counter, etc., or a list of items such as a shopping list, into the device; and the device determines a path to the location or items. The device then generates and presents directions for navigation. The path may be calculated to avoid hazards, such as shelves being stocked, congested checkout lines, and spilled items. Thus, a visually impaired person may use the device to safely navigate the store and locate items. The directions may be generated as speech to the user through a speaker, headphones, or an earpiece.

Planes of infrared beams are arranged within the environment such that a navigation device is likely to or must pass through a plane. A path may be computed to ensure that the navigation device passes through an IR plane. The navigation device has a plurality of IR sensors arranged in a tetrahedron. As the device passes through an IR plane, the device receives signals from the sensors. Given the order and timing of the signals and a location of the IR plane, the device performs a calibration in all three directions. The device is calibrated without requiring the user to place the device in a cradle.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
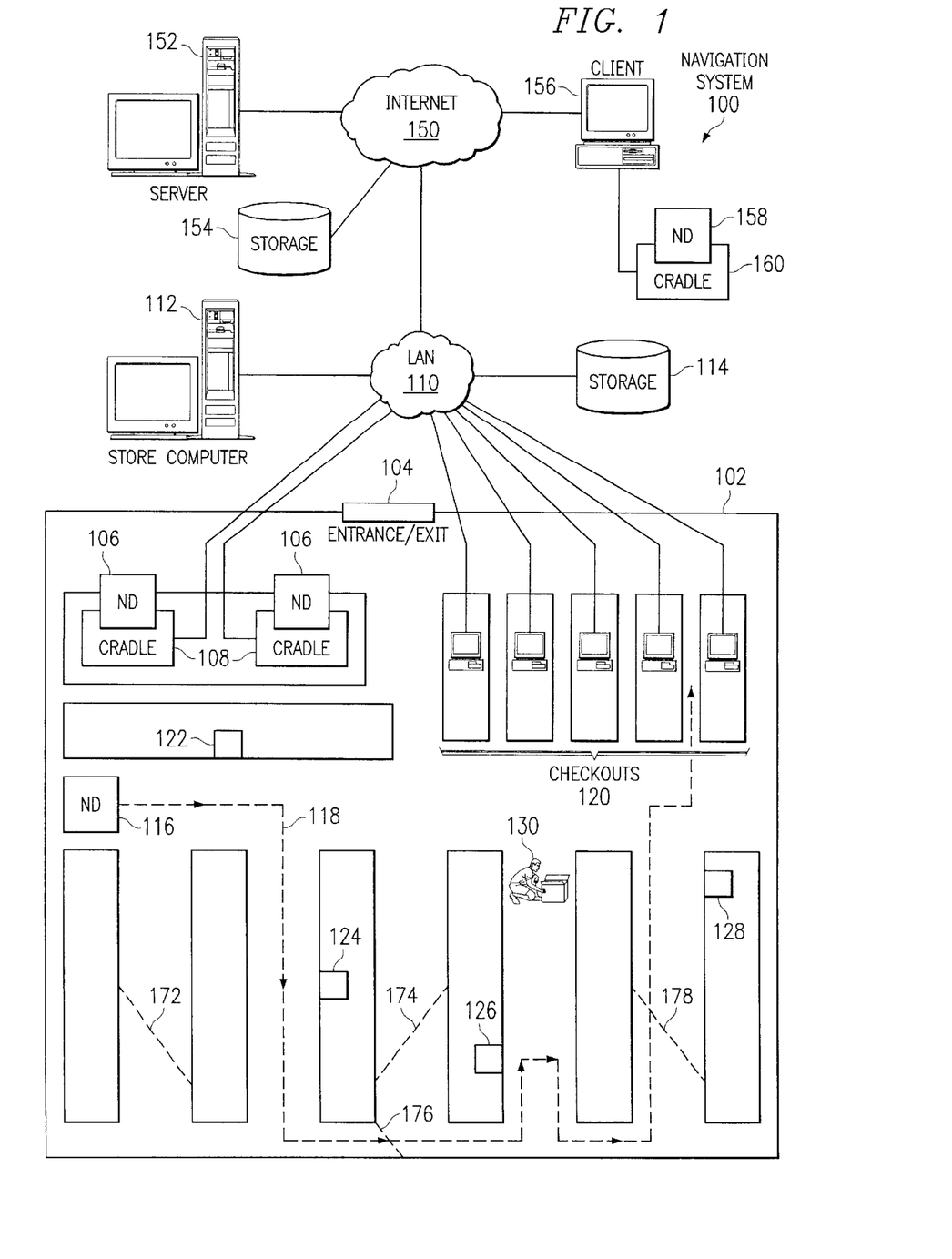
FIG. 1 depicts a pictorial representation of a store navigation system in which the present invention may be implemented.

With reference now to the figures, FIG. 1 depicts a pictorial representation of a store navigation system in which the present invention may be implemented. A shopper enters store 102 through entrance/exit 104. The shopper takes a navigation device (ND) 106 from a cradle 108, or places a personal ND into cradle 108 upon entering the store.

While navigation device 106 is engaged with cradle 108, the device initializes the location to the location of the cradle. The location of the cradle is determined relative to a reference coordinate system having three dimensions. The cradle may be configured so that the navigation device can only be engaged in one orientation, such as pointing straight upward. When engaged with a cradle, the navigation device may communicate with store computer 112 and storage 114 through local area network (LAN) 110. Store computer 112 may be a server computer. Navigation system 100 may include additional cradles 108 throughout the store for updating or calibrating position and orientation information. Additional cradles may also be used to update other information, such as locations of hazards and items that may change.

The LAN is the medium used to provide communications links between various devices and computers connected together within navigation system 100. LAN 110 may include connections, such as wire, wireless communication links, or fiber optic cables. The navigation device may download item location information, checkout location information, cradle location information, Universal Product Code (UPC) information for the items, and hazard information from storage 114. The downloaded location information is relative to the reference coordinate system. Therefore, the navigation device may determine location with respect to the reference coordinate system and, thus, with respect to items and landmarks in the environment.

A shopping list may be entered into a navigation device while it is engaged with a cradle or after it has been taken off the cradle. Shopping lists may be entered by use of a bar code scanner, optical character recognition, keypad entry, or by diskette or other storage medium. In accordance with a preferred embodiment of the present invention, shopping lists may be downloaded from storage 114 through store computer 112 and LAN 110, as will be discussed in further detail below.

Once a navigation device, such as navigation device 116, has been initialized with location information, orientation information, item information, and a shopping list, the device may be used to navigate the store. The navigation device computes a path through the store, the path visiting the location of each item on the shopping list and ending at a checkout location. In the example shown in FIG. 1, navigation device (ND) 116 computes path 118 to checkout location 120, the path visiting items 122, 124, 126, 128 on the shopping list. The navigation device may compute the path in a known manner. For example, the navigation device may compute all possible paths and select the path having the shortest distance. The navigation device may also select a path that avoids a hazard, such as hazard 130. A hazard may be, for example, a spill or an aisle being blocked by store personnel stocking a shelf. The path may also be computed such that large or heavy items are placed in a shopping cart first, while fragile or breakable items are placed in the shopping cart last.

In accordance with a preferred embodiment of the present invention, LAN 110 may be connected to Internet 150. In the depicted example, a server 152 is connected to Internet 150 along with storage unit 154. In addition, client 156 also is connected to Internet 150. Clients 156 may be, for example, a personal computer or network computer. In the depicted example, server 152 provides data, such as boot files, operating system images, and applications to client 156. Client 156 is a client to server 152. For example, server 152 may be a world wide web server and client 156 may communicate with the web server using a browser application, as is known in the art.

Navigation system 100 may include additional servers, clients, and other devices not shown. In the depicted example, Internet 150 represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, navigation system 100 also may be implemented as a number of different types of networks, such as, for example, an intranet, a local area network (LAN), or a wide area network (WAN). Furthermore, store computer 112, storage 114, server 152, storage 154, and client 156 may all be connected to the same network, such as the Internet. Cradles 108 and cash registers may be connected in a known manner to store computer 112. FIG. 1 is intended as an example, and not as an architectural limitation for the present invention.

A shopper may use client 156 to customize a shopping list and other preferences for a navigation device. The shopping list may also be stored in storage 154 and accessed by a navigation device 106 through LAN 110 and Internet 150. In accordance with a preferred embodiment of the present invention, client 156 uploads shopping list information and preference information to storage 114. Thus, when the shopper visits store 102, the shopper provides identification to a navigation device 106 in a cradle 108. In response to the identification of the shopper, the navigation device downloads the shopping list information and preference information from a server connected to storage 114 or storage 154. The shopper may provide identification information through a keypad, bar code reader, or other known methods. For example, the shopper may have a card having an identification bar code. The shopper may also print a shopping list identification bar code at client 156 using a printer (not shown), the identification bar code being associated with a shopping list stored in storage 114 or storage 154.

In accordance with another embodiment of the present invention, a shopper is issued a personal navigation device 158, which communicates with client 156 through cradle 160. Thus, the shopper may download shopping list information and preference information directly to navigation device 158 through cradle 160. In this embodiment, client 156 may not be connected to Internet 150. The navigation device may then be engaged with a cradle in the store for initialization of location information, orientation information, item information, and hazard information.

The example shown in FIG. 1 demonstrates a shopper navigating a store; however, the present invention relates to any pedestrian navigable environment. In accordance with the present invention, an environment is any building or outdoor structure, in which a pedestrian may travel, such as a store, shopping mall, flee market, hospital, or airport. The term "pedestrian," as used herein, refers to a person traveling by foot or assisted by a wheelchair. However, a pedestrian may also be assisted by a skateboard, roller skates, automatic cart, or the like.

Figure 2:
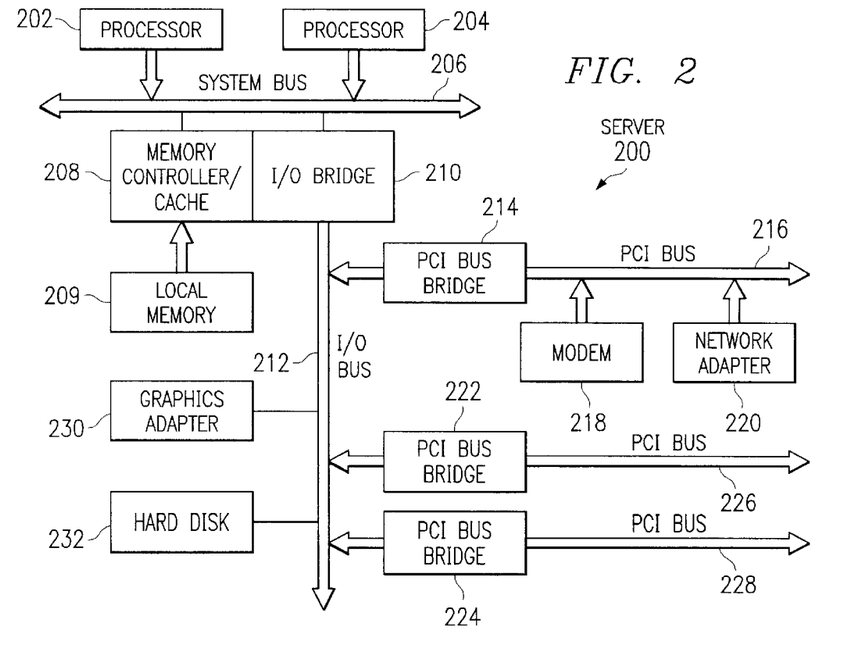
FIG. 2 is a block diagram of a data processing system that may be implemented as a server in accordance with a preferred embodiment of the present invention.

Referring to FIG. 2, a block diagram of a data processing system that may be implemented as a server, such as server 152 and store computer 112 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to computers 156 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
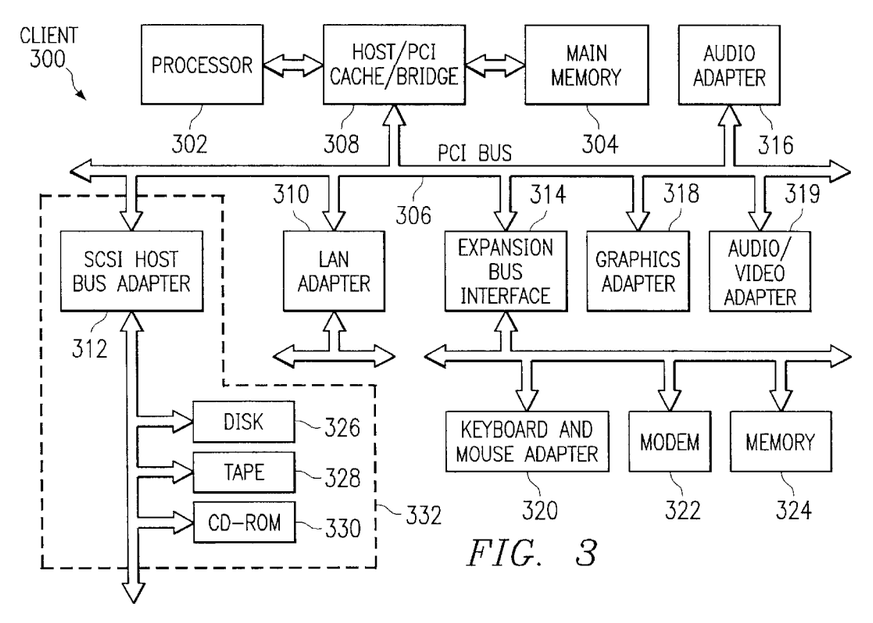
FIG. 3 is a block diagram illustrating a client data processing system in accordance with a preferred embodiment of the present invention.

With reference now to FIG. 3, a block diagram illustrating a data processing system is depicted in which the present invention may be implemented. Data processing system 300 is an example of a client computer, such as client 156 in FIG. 1. Store computer 112 may also be employed as a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000™, which is available from Microsoft Corporation. An object oriented programming system such as Java™ may run in conjunction with the operating system and provide calls to the operating system from Java programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
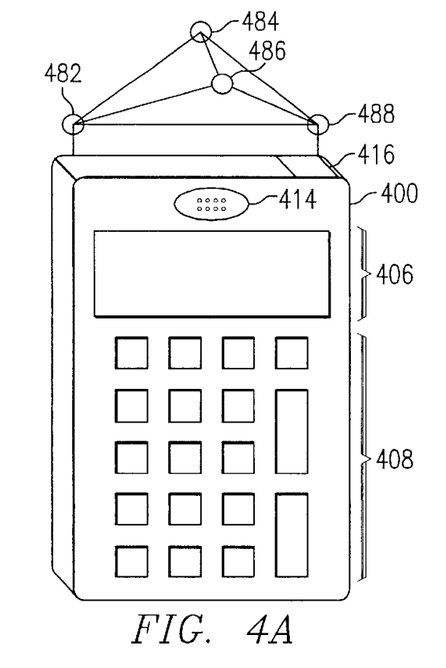
FIG. 4A is a diagram illustrating a navigation device in accordance with a preferred embodiment of the present invention.

With reference now to FIG. 4A, a diagram illustrating a navigation device is depicted in accordance with a preferred embodiment of the present invention. Navigation device 400 includes a display 406 for presenting textual and graphical information. Display 406 may be a known display device, such as a liquid crystal display (LCD) device. The display may be used to present a map or directions for navigating a store or building, item information, or a running total of purchase price based on products scanned or entered into the device. Item information may include, for example, the shelf on which the item may be found, the type of packaging, the size and/or weight of the item, price, and nutritional information. The device may also be configured to present advertisements to the user via display 406.

Navigation device 400 may also include keypad 408, speaker 414, bar code reader 416, and microphone (not shown). The keypad may be used to enter, for example, user identification information, item identification information, and commands for interacting with the interface. For example, a user may decide to skip an item and delete it from a shopping list. Additional input devices may be included in place of or in addition to keypad 408, such as a touchpad or light pen.

Audio information, such as navigation directions and other feedback information may be presented via speaker 414. Feedback information may include, for example, advertisements, an indication that an item has been successfully scanned, location and description of an item, and a running total of purchase price. Audio information may also be presented through headphones or an earpiece. Headphones or an earpiece may be connected to the navigation device through an audio jack (not shown).

Bar code reader 416 may be used to scan items, as they are located. Scanning an item serves as a notification that the user has reached a location in the path and is to be directed to the next item or location. The device may also remove the item from a shopping list and add the item to a checkout list in response to the scanning of an item. The bar code reader may also be used to identify a user. For example, a visually impaired person may be issued a card having unique identification information encoded thereon in the form of a bar code. The visually impaired person may then scan the card to activate the navigation device and download a corresponding shopping list. An optical reader (not shown) may also be included in navigation device 400 in place of or in addition to bar code reader 416. An optical reader may be used to scan a printed shopping list or other textual information using optical character recognition, as known in the art.

Although the depicted representation shows a specialized device, other embodiments of the present invention may be implemented in other types of data processing systems, such as a personal digital assistant, palmtop computer, or telephony device. Navigation device 400 also preferably includes a graphical user interface that may be implemented by means of systems software residing in computer readable media in operation within navigation device 400.

In the present invention, accelerometers are used to determine position and orientation of a navigation device. However, accelerometers are not sufficiently accurate for determination of location and position for extended periods of time. Thus, locations and orientations determined using accelerometers tend to drift and be in error after extended use. A navigation device using accelerometers may be calibrated by placing the device into a cradle, thus establishing a position and orientation. However, this calibration technique is inconvenient, especially when navigating a confusing environment for which a navigation device is necessary. Particularly, if a user has a visual or mobility impairment, finding and using a cradle for calibration may be difficult.

Figure 4B:
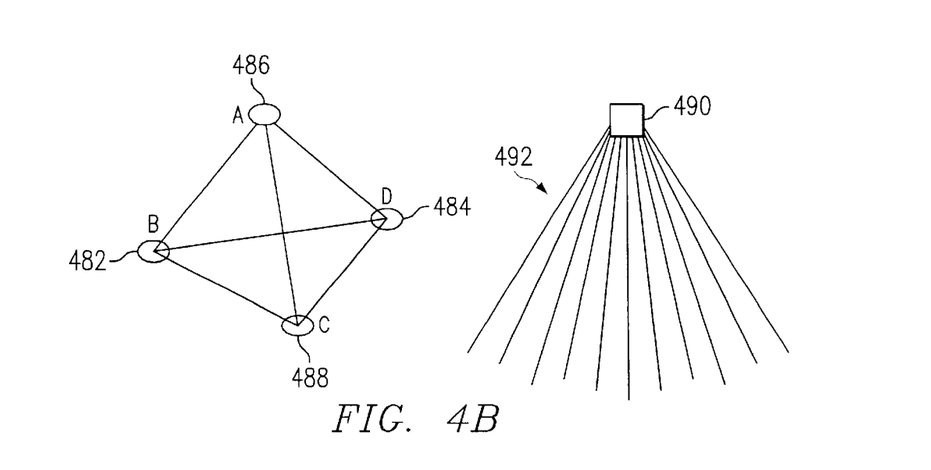
FIG. 4B is a diagram illustrating a tetrahedron of sensors in relation to a plane of infrared beams in accordance with a preferred embodiment of the present invention.

In accordance with a preferred embodiment of the present invention, navigation device 400 includes infrared (IR) sensors 482, 484, 486, 488 arranged in a tetrahedron. Turning now to FIG. 4B, a diagram is shown illustrating a tetrahedron of sensors in relation to a plane of infrared beams in accordance with a preferred embodiment of the present invention. An infrared source 490 emits a wall of infrared beams forming a plane 492. As the tetrahedron including sensors 482, 484, 486, 488 passes through the IR plane, the navigation device 400 receives a signal from each sensor.

Figure 4C:
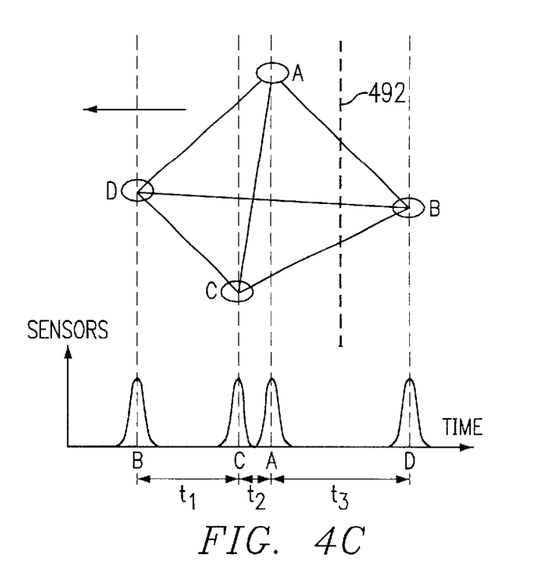
FIG. 4C is an illustration of an edge view of a tetrahedron passing through an infrared plane in accordance with a preferred embodiment of the present invention.

With reference now to FIG. 4C, an illustration of an edge view of a tetrahedron passing through an infrared plane is shown in accordance with a preferred embodiment of the present invention. In the example shown in FIG. 4C, as the tetrahedron passes through IR plane 492, sensor B passes through first, sensor C second, sensor A third, and sensor D last. Time $t_1$ elapses between sensor B and sensor C, time $t_2$ elapses between sensor C and sensor A, and time $t_3$ elapses between sensor A and sensor D. Navigation device 400 then uses the times at which the sensors pass through the plane as a projection of the tetrahedron onto a line. Given the order in which the sensors pass through the IR plane and the time elapsed between each sensor, the device solves for the orientation and the location of the tetrahedron and the speed at which the tetrahedron passes through the plane. The calculations are performed using known techniques.

As discussed below with respect to FIG. 4E, the navigation device measures movement in three orthogonal directions and rotation about three orthogonal axes using a plurality of accelerometers. This movement information is then applied to a three dimensional reference coordinate system to continuously determine a current location within the reference coordinate system. Therefore, upon detecting the location of the IR plane, the navigation device may reset the current location to that of the IR plane. Furthermore, upon calculation of the orientation of the tetrahedron, the navigation device may reset the orientation of the axes of the accelerometers with respect to the reference coordinate system. Orientation is computed as a vector in the three dimensional space. The vector is a function of x, y, and z corresponding to an angle between x and y planes and a second angle in the z plane. Still further, the accelerometers measure acceleration with respect to a reference velocity. In other words, if a measured acceleration in a given direction is zero, then the velocity in that direction is unchanged. Thus, upon calculation of the velocity of the tetrahedron as it passes through the IR plane, the navigation device resets the current velocity to the calculated velocity in a direction determined based on the orientation of the tetrahedron. This direction is determined with respect to the reference coordinate system.

Although the examples shown in FIGS. 4A, 4B, and 4C depict the sensors arranged in a tetrahedron, any three-dimensional shape or arrangement may be employed. A tetrahedron achieves a three-dimensional shape with the fewest sensors. However, as long as the dimensions of the shape are predetermined, another three-dimensional shape, such as a cube, may be used.

Figure 4D:
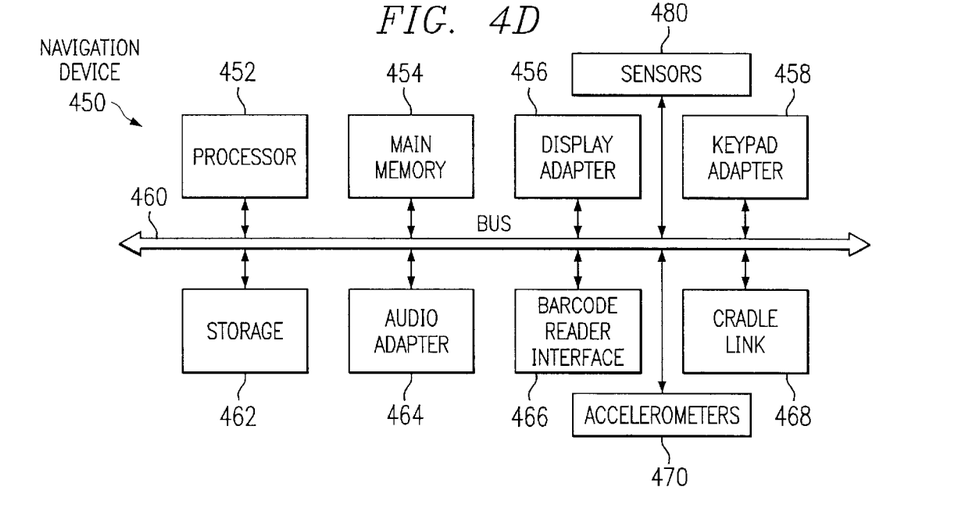
FIG. 4D is a block diagram illustrating the hardware configuration of a navigation device in accordance with a preferred embodiment of the present invention.

Turning now to FIG. 4D, a block diagram illustrating the hardware configuration of a navigation device is shown in accordance with a preferred embodiment of the present invention. Navigation device 450 is an example of a navigation device, such as navigation device 400 in FIG. 4A, in which code or instructions implementing the processes of the present invention may be located. Navigation device 450 employs bus architecture. Processor 452 and main memory 454 are connected to bus 460. Display adapter 456, keypad adapter 458, storage 462, audio adapter 464, and barcode reader interface 466 are also connected to bus 460.

An operating system runs on processor 452 and is used to coordinate and provide control of various components within navigation device 450 in FIG. 4D. The operating system may be a commercially available operating system such as Windows CE™, which is available from Microsoft Corporation, or Palm OS™ from Palm, Inc. Instructions for the operating system and applications or programs are located on storage devices, such as storage 462, and may be loaded into main memory 454 for execution by processor 452.

Navigation device 450 also includes accelerometers 470 connected to bus 460. Accelerometers 470 measure movement in six directions—motion along three mutually perpendicular axes and rotation about each of those axes. Thus accelerometers 470 provide location, orientation, and speed information. Accelerometers are generally known in the art.

Other position determination devices may also be used in place of or in addition to accelerometers 470. For example, navigation device 450 may use a geographic positioning system (GPS) to determine position.

Those of ordinary skill in the art will appreciate that the hardware in FIG. 4D may vary depending on the implementation. Other internal hardware or peripheral devices, such as flash ROM (or equivalent nonvolatile memory) or optical disk drives and the like, may be used in addition to or in place of the hardware depicted in FIG. 4D. For example, navigation device 450 may be a personal digital assistant (PDA), which is configured with ROM and/or flash ROM to provide non-volatile memory for storing operating system files and/or user-generated data.

The depicted example in FIG. 4D and above-described examples are not meant to imply architectural limitations. For example, navigation device 450 also may be a notebook computer or hand held computer in addition to taking the form of a PDA.

To provide motion sensing within the navigation device, an inertial sensor system such as one containing six silicon solid state accelerometers is used to monitor the movement of the navigation device from its last known position. Any motion up, down, left, right, forward, back, or change in attitude is recorded by the six sensor accelerometers. These silicon accelerometer sensors may be similar to ADXL202 accelerometer chips from Analog Devices. The six silicon accelerometer sensors are inexpensive and much less costly than a GPS receiver and provide more detailed accuracy within a limited, confined area such as a store or building.

Figure 4E:
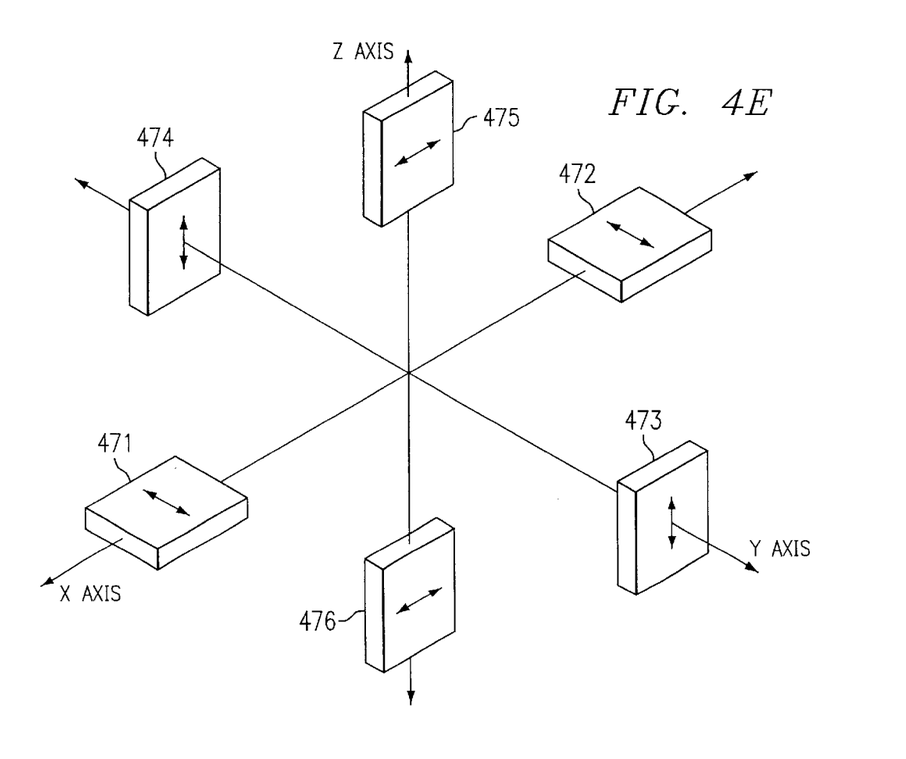
FIG. 4E is a block diagram illustrating an exemplary configuration of accelerometers in accordance with a preferred embodiment of the present invention.

Turning now to FIG. 4E, a block diagram is shown illustrating an exemplary configuration of accelerometers in accordance with a preferred embodiment of the present invention. Six accelerometers are arranged to measure movement along three axes. Accelerometers 471, 472 are placed along the X axis and measure movement along the Y axis. Accelerometers 471, 472 may also measure rotation about the Z axis. For example, rotation about the Z axis may cause accelerometer 471 to indicate movement in a positive direction and accelerometer 472 to indicate movement in a negative direction.

Similarly, accelerometers 473, 474 are placed along the Y axis and measure movement along the Z axis and rotation about the X axis. Accelerometers 475, 476 are placed along the Z axis and measure movement along the X axis and rotation about the Y axis. The accelerometers measure acceleration and, from the measured accelerations and time expired, the device can determine speed and distance traveled in each three dimensional plane. The distances traveled, as determined using the accelerometers, may be translated into a three dimensional reference coordinate system to determine location with respect to items and landmarks with predetermined locations in the reference coordinate system.

Movement information retrieved from the inertial sensors is used to compute a new reference position. Specifically, using speed and direction information relative to the last reference position, a vector can be computed in three dimensional space to derive the new position. Position and direction information will be used to indicate to the user which direction to turn relative to their current position to direct them to the desired item or location.

A person of ordinary skill in the art will recognize that other arrangements of accelerometers may be used. For example, if the navigation device is mounted to a shopping cart, one may assume that the device will remain parallel to the floor thereby reducing the navigation to a two dimensional space. In this instance fewer accelerometers may be used, such as accelerometers 471, 472, 475. Other possible arrangements may include rotational sensors or gyroscopes, as known in the art.

Returning to FIG. 1, IR planes may be arranged throughout an environment, such as store 102. IR planes 172, 174, 176, 178 are arranged such that a shopper will likely pass through at least one plane. Other arrangements may be employed, such as a plane on every aisle or only one plane at a point in the environment at which a device may require calibration, such as at a predetermined distance from cradles 108. In the example shown in FIG. 1, the path selected for device 116 passes through IR planes 176, 178. Therefore, at those points, the navigation device receives signals from the sensors and calculates the orientation and speed of the device.

Given the location of the IR plane and the calculated orientation and speed, the navigation device is calibrated. The location of the IR plane may be determined by determining the closest IR plane to the location of the device prior to calibration. According to a preferred embodiment of the present invention, each IR source may emit the infrared beams at a different frequency. Therefore, the sensors may detect the frequency of the IR beams and the navigation device may determine the current location at that time based on the detected frequency. Other methods of determining a current position at calibration may be used, such as for example polling a radio frequency transceiver (not shown) at time of calibration.

Furthermore, the IR planes may be arranged at various angles with respect to the isles, walls, and floor to ensure that the tetrahedron of sensors does not traverse every plane in the same orientation. IR planes may also be placed substantially parallel to a floor so that a navigation device passes through the plane when traveling on a staircase, escalator, or elevator or moving up and down shelves along an aisle.

Figure 5:
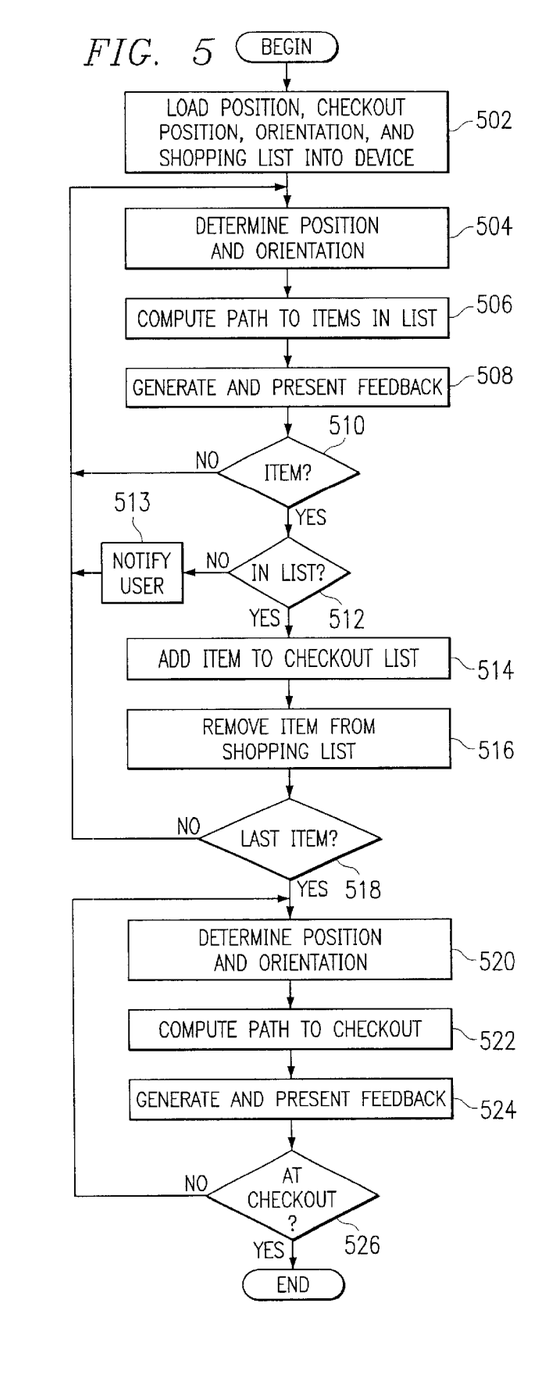
FIG. 5 is a flowchart illustrating the operation of a navigation device in accordance with a preferred embodiment of the present invention.

With reference now to FIG. 5, a flowchart is shown illustrating the operation of a navigation device in accordance with a preferred embodiment of the present invention. The process begins when a user activates the device, such as by providing identification information. Next, the process loads position, checkout location, orientation, and shopping list data into the navigation device (step 502). The loaded locations, such as initial location of the navigation device in the cradle, checkout location, item locations, and aisle and shelf locations, are predetermined with respect to a three dimensional reference coordinate system. Thereafter, all locations are determined relative to this reference coordinate system.

The process determines a current position and orientation (step 504), computes a path to the items in the shopping list (step 506), and generates and presents feedback to the user (step 508). Feedback preferably includes, but is not limited to, directions to a next item in the shopping list or other locations in the store or building. Current position and orientation may be determined by translating movement information received from the accelerometers into the reference coordinate system.

It should be noted that at any time a user can query, by voice or other input means, the navigation device for directions to a designated item or location in the building from the current position of the navigation device. An updated set of directions based upon the current position is then presented to the user. Using accelerometers as described, the feedback can be as granular as specifying to the user that the desired item is so many inches or feet above or below the current position of the navigation device; thereby enabling a user to locate items on individual shelves at a determined position along an aisle.

A determination is made as to whether an item is located (step 510). The item may be identified by scanning the UPC bar code on the item, selecting the item from the shopping list, or other method, such as entering identification information using the keypad. If an item is not located, the process returns to step 504 to determine position and orientation.

If an item is located in step 510, a determination is made as to whether the item is in the shopping list (step 512). If the item is not in the shopping list, the process notifies the user (step 513) and returns to step 504 to determine position and orientation. The process may notify the user with a tone, text message, or audio message. If the item is not in the shopping list, the item may be an item the user decided to buy on impulse. However, if the user is visually impaired, the item may have been selected by mistake and the user may be given an opportunity to delete the item from the checkout list.

If the item is in the shopping list in step 512, the process adds the item to the checkout list (step 514) and removes the item from the shopping list (step 516). A determination is made as to whether the item is the last item on the shopping list (step 518). If the item is not the last item on the shopping list, the process returns to step 504 to determine position and orientation.

If the item is the last item in step 518, the process directs the user to the checkout position by determining current position and orientation (step 520), computing a path to the checkout position (step 522), and generating and presenting feedback to the user (step 524). A determination is made as to whether the device is located at the checkout position (step 526). If the device is not at the checkout position, the process returns to step 520 to determine current position and orientation. If the device is at the checkout position in step 526, the process ends.

The process may be modified so that the user may proceed to step 520 at any time to be directed to the checkout. Therefore, if the user decides to leave the store, the navigation device may direct the user to the checkout position without locating every item in the shopping list. The process may also be modified to direct the user to an emergency exit in response to a command from the user or detection of an alarm. An alarm may be detected using a microphone or radio transceiver.

Figure 6:
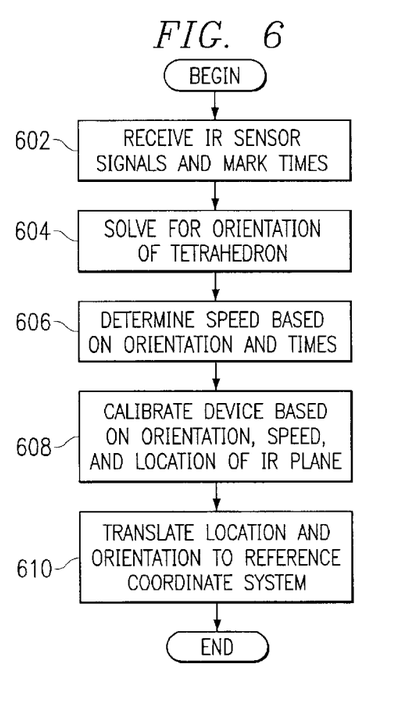
FIG. 6 is a flowchart illustrating a calibration operation in accordance with a preferred embodiment of the present invention.

With reference now to FIG. 6, a flowchart is shown illustrating a calibration operation in accordance with a preferred embodiment of the present invention. The process begins and receives IR sensor signals and marks the times of each sensor signal (step 602). Next, the process solves for the orientation of the tetrahedron that would result in the projection of the signals on the time domain (step 604). In other words, the timing of the signals may be associated with a projection of the tetrahedron on an axis perpendicular to the plane. Therefore, given the projection of the tetrahedron on a line, the device solves for the orientation of the tetrahedron.

Thereafter, the process determines the speed based on the orientation and the times of the sensor signals (step 606). Given prior knowledge of the dimensions of the tetrahedron and having solved for the orientation, the device determines the distance from the first sensor and the last sensor along a line perpendicular to the plane. The speed is then determined by dividing this length by the time elapsed between the first sensor and the last sensor. Then, the process calibrates the navigation device based on the orientation, the speed, and the location of the IR plane (step 608). Finally, the process translates the calibrated location, orientation, and speed to the reference coordinate system (step 610) and ends.

While the examples shown herein relate to a store and a shopping list, the present invention is equally applicable to other environments. For example, the navigation device of the present invention may be used to assist a picker in a warehouse. Customers could order bundled items, such as a computer system, using a client computer and a pick list may be saved in storage. A picker may print an identification of the pick list and use the identification to activate a navigation device. Thus, the navigation device may compute a path to the items on the pick list. As another example, a hospital worker may use the navigation system of the present invention to collect items or distribute equipment in a hospital. Generally, the present invention may be used to assist users, particularly people with visual impairment, in navigating confusing and potentially hazardous environments.

The invention is also applicable to any type of building or structure. For example, it could be used by a visually impaired person to locate a specific seat location in an auditorium or stadium for a concert. It is also useful for locating restrooms and customer service counters in buildings. The three dimensional advantages with the use of the six accelerometers enables the detection of whether or not the user of the navigation device is on the correct floor of the building for the desired item or location. This is helpful in concert halls where a men's restroom may be on one floor and the women's restroom is directly above or below on another floor, or for locating items in department stores having multiple floors.

The invention is also useful in other types of buildings such as an airport. A user may be able to pick up a navigation device out of a calibration cradle at an entrance to the airport or at a gate upon deboarding a plane. The navigation device could direct the user to a gate, a specific ticket counter, customer service counter, baggage claim, a food court including a specific type of food establishment within the food court, ground transportation, etc. In embodiments having accelerometers positioned such as to enable the measurement of distance in a three dimensional space, the navigation device enables the user to be directed to any of these types of locations even if any of the desired locations are located on different levels or floors of the airport.

The present invention solves the disadvantages of the prior art by providing a self-sufficient device, which generates and presents feedback to assist users in navigating a three dimensional environment. A path may be computed based on a list of items or locations. The path may be computed to guide the user efficiently and safely to the items on the list. For example, the path may be computed to avoid known hazards in the three dimensional environment.

The present invention also may present feedback audibly via a speaker, headphones, or an earpiece. Thus, a visually impaired person is provided with assistance without calling attention to the impairment, thus avoiding frustration and embarrassment. Furthermore, the present invention allows a visually impaired person to navigate environments that were previously too confusing or potentially dangerous. Therefore, a visually impaired person may participate in more activities independently.

The present invention solves the disadvantages of the prior art by providing a self-sufficient device, which generates and presents feedback to assist users in navigating a three dimensional environment. Planes of infrared beams are arranged within the environment such that a navigation device is likely to or must pass through a plane. A path may be computed to ensure that the navigation device passes through an IR plane. The navigation device has a plurality of IR sensors arranged in a tetrahedron. As the device passes through an IR plane, the device receives signals from the sensors. Given the order and timing of the signals and a location of the IR plane, the device performs a calibration. The device is calibrated without requiring the user to place the device in a cradle. Thus, a visually impaired person is provided with assistance without calling attention to the impairment, thus avoiding frustration and embarrassment. Furthermore, the present invention allows a visually impaired person to navigate environments that were previously too confusing or potentially dangerous.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for calibrating a navigation device, wherein the navigation device includes a plurality of sensors, the method comprising:

receiving sensor signals from the plurality of sensors as the navigation device traverses a plane of source signals, wherein the sensors receive the source signals and generate the sensor signals in response to the plurality of sensors traversing the plane of source signals; and determining, based on the sensor signals, location information and orientation information for the sensors, wherein the plurality of sensors are three or more sensors.

2. The method of claim 1, wherein the source signals are infrared signals.

3. The method of claim 1, wherein the source signals are transmitted at a source frequency.

4. The method of claim 3, wherein the sensor signals are used to identify the source frequency.

5. The method of claim 4, wherein the step of determining location information comprises determining the location information based on the source frequency.

6. The method of claim 5, further comprising calibrating the navigation device based on at least one of orientation information and location information.

7. The method of claim 1, wherein the step of determining location information comprises determining the location information based on an expected location of the plane of source signals.

8. The method of claim 1, further comprising calibrating the navigation device based on the location information.

9. The method of claim 1, wherein the sensors are arranged in a three-dimensional shape.

10. The method of claim 9, wherein the three-dimensional shape is a tetrahedron.

11. A navigation device comprising:

a plurality of sensors that provide sensor signals as the navigation device traverses a plane of source signals, wherein the sensors receive the source signals and generate the sensor signals in response to the plurality of sensors traversing the plane of source signals; and a processor, coupled to the plurality of sensors, wherein the processor determines, based on the sensor signals, location information and orientation information for the sensors, to calibrate the navigation device.

12. The apparatus of claim 11, wherein the source signals are infrared signals.

13. The apparatus of claim 11, wherein the source signals are transmitted at a source frequency.

14. The apparatus of claim 13, wherein the sensor signals are used to identify the source frequency.

15. The apparatus of claim 14, wherein the processor determines the location information based on the source frequency.

16. The apparatus of claim 11, wherein the processor determines the location information based on an expected location of the plane of source signals.

17. The apparatus of claim 11, wherein the processor calibrates the navigation device based on at least one of location information and orientation information.

18. The apparatus of claim 11, wherein the sensors are arranged in a three-dimensional shape.

19. The apparatus of claim 18, wherein the three-dimensional shape is a tetrahedron.

20. A computer program product, in a computer readable medium, for calibrating a navigation device, wherein the navigation device includes a plurality of sensors, the computer program product comprising:

instructions for receiving sensor signals from the plurality of sensors as the navigation device traverses a plane of source signals, wherein the sensors receive the source signals and generate the sensor signals in response to the plurality of sensors traversing the plane of source signals; and instructions for determining, based on the sensor signals, location information and orientation information for the sensors, wherein the plurality of sensors are three or more sensors.

21. The computer program product of claim 20, further comprising instructions for calibrating the navigation device based on at least one of location information and orientation information.

22. The method of claim 1, wherein the sensors are arranged in a two-dimensional shape.

23. The apparatus of claim 11, wherein the sensors are arranged in a two-dimensional shape.

24. The computer program product of claim 20, wherein the sensors are arranged in a two-dimensional shape.

* * * * *

UNITED STATES PATENT AND TRADEMARK OFFICE
CERTIFICATE OF CORRECTION

PATENT NO.    : 6,618,683 B1
DATED         : September 9, 2003
INVENTOR(S)   : Berstis et al.

It is certified that error appears in the above-identified patent and that said Letters Patent is hereby corrected as shown below:

Drawings,
Sheet 3, replace figure 4C with the attached figure.

Column 14,
Line 16, after "sensors" delete ",".

Signed and Sealed this

Fifth Day of October, 2004

JON W. DUDAS
*Director of the United States Patent and Trademark Office*